United States Patent
Zou et al.

(10) Patent No.: US 6,185,357 B1
(45) Date of Patent: Feb. 6, 2001

(54) ILLUMINATION SYSTEM USING EDGE-ILLUMINATED HOLLOW WAVEGUIDE AND LENTICULAR OPTICAL STRUCTURES

(75) Inventors: Han Zou, Windsor; Karl W. Beeson, Princeton, both of NJ (US)

(73) Assignee: Honeywell International Inc., Morristown, NJ (US)

( * ) Notice: Under 35 U.S.C. 154(b), the term of this patent shall be extended for 0 days.

(21) Appl. No.: 09/151,089

(22) Filed: Sep. 10, 1998

(51) Int. Cl.[7] .................................................. G02B 6/00
(52) U.S. Cl. ..................... 385/133; 385/146; 385/901; 362/339
(58) Field of Search ..................... 385/133, 147, 385/901, 36, 146; 359/592, 593, 594, 595; 362/554, 556, 560, 339

(56) References Cited

U.S. PATENT DOCUMENTS

| | | | |
|---|---|---|---|
| 4,260,220 | 4/1981 | Whitehead | 350/96.28 |
| 4,542,449 | 9/1985 | Whitehead | 362/330 |
| 4,615,579 | 10/1986 | Whitehead | 350/96.1 |
| 4,984,144 * | 1/1991 | Cobb, Jr. et al. | 362/339 |
| 5,190,370 | 3/1993 | Miller et al. | 362/340 |
| 5,396,350 | 3/1995 | Beeson et al. | 359/40 |
| 5,404,869 | 4/1995 | Parkyn, Jr. et al. | 126/699 |
| 5,428,468 | 6/1995 | Zimmerman et al. | 359/40 |
| 5,521,725 | 5/1996 | Beeson et al. | 359/40 |
| 5,555,329 | 9/1996 | Kuper et al. | 385/36 |
| 5,598,281 | 1/1997 | Zimmerman et al. | 349/5 |
| 5,676,453 | 10/1997 | Parkyn, Jr. et al. | 362/260 |

\* cited by examiner

Primary Examiner—Phan T. H. Palmer
(74) Attorney, Agent, or Firm—John G. Shudy, Jr.

(57) ABSTRACT

An illumination system having a hollow waveguide including first and second light directing arrays (LDA), each having a plurality of generally lenticular prisms defined thereon and arranged generally orthogonally with respect to each other. Light rays from a light source enter the waveguide through a light input side and emerge from the waveguide through a light output side at a predetermined flux and angular distribution. The light output flux and angular distribution can each be independently controlled in accordance with the present invention by the LDAs to provide an illumination system that can be configured for various light output distribution and intensity requirements.

51 Claims, 10 Drawing Sheets

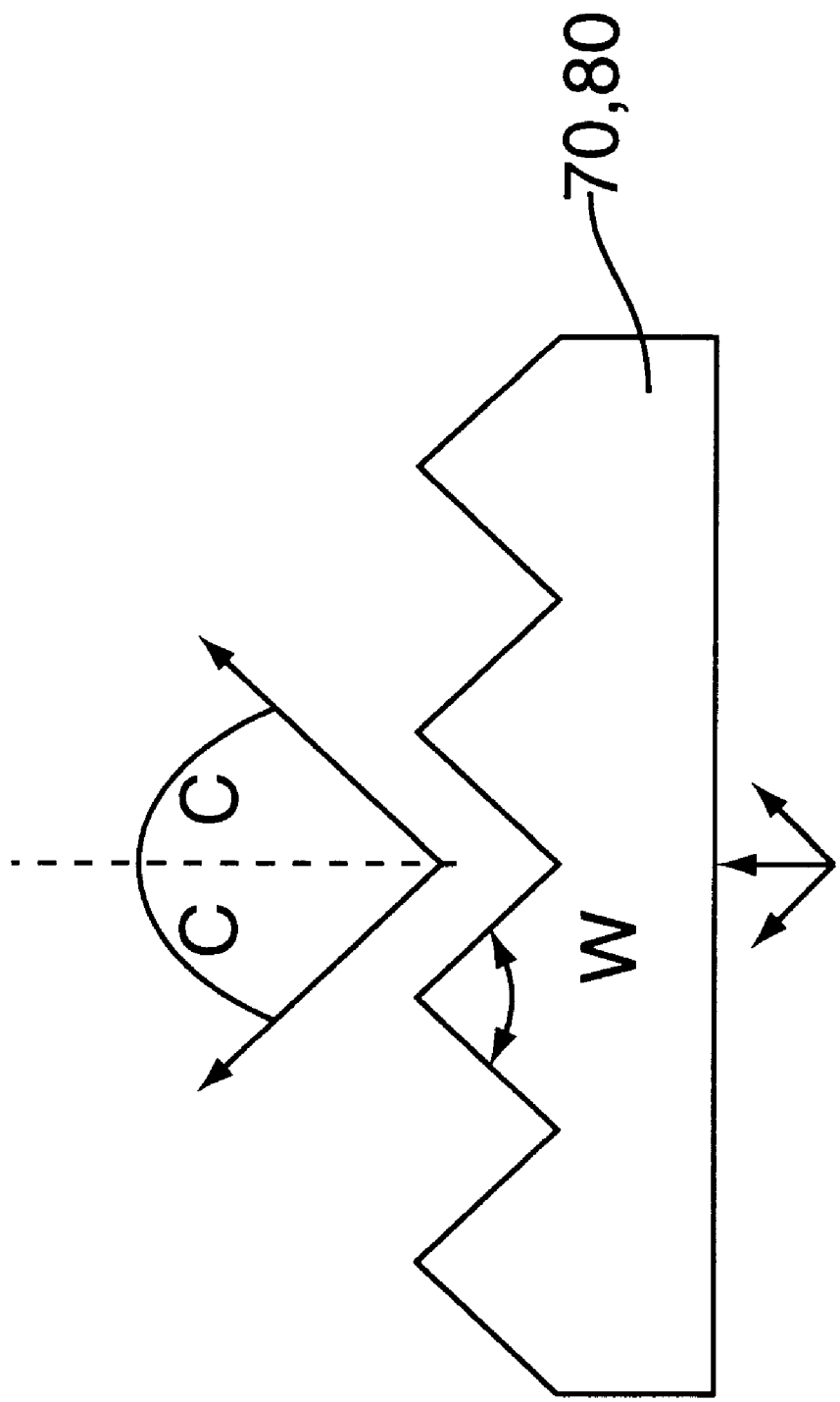

ILLUMINATION SYSTEM USING EDGE-ILLUMINATED HOLLOW WAVEGUIDE AND LENTICULAR OPTICAL STRUCTURES

BACKGROUND OF THE INVENTION

1. Field of the Invention

This invention relates to illumination systems, and more particularly, to an edge-lit illumination system including a hollow waveguide and one or two stackingly arranged transparent light directing arrays (LDA) that provide a light output from the illumination system having a predetermined angular distribution.

2. Description of the Prior Art

Luminaires or illumination systems employed in an office environment must be suited for both conventional paper tasks, which are typically performed on a horizontal surface with the viewer's eyes directed downward, and for computer-based or visual display terminal (VDT) tasks, which are typically performed with the viewer's eyes directed toward the VDT and which include part of the ceiling in the field of view. For VDT tasks, it is therefore important to control the luminance of luminaires installed in the ceiling to minimize reflected glare or veiling reflections on a VDT. As a general rule of thumb, the ceiling luminance should not exceed ten (10) times that of the VDT screen. See, e.g. American National Standard Practice For Office Lighting, ANSI/IESNA RP-1-1993, pp. 34–41. Ceiling luminaires may cause: image glare, where the viewer sees the image of the illumination system on the VDT; area glare, where an area of brightness appears on the VDT; and uniform glare, which results in a reduction of the brightness and contrast of the VDT. Each of these glare problems adversely effects a persons ability to perform VDT tasks. For indirect luminaires, a generally widespread light distribution and uniform light output brightness will address glare problems. In addition, undesirable glare effects will be further reduced by controlling the light output from the luminaire at viewing angles ranging from between 55° and 90° (e.g. it is recommended that the average luminance in this angular viewing range not exceed 850 cd/m$^2$ when viewed in the lengthwise and crosswise directions and at an angle of 45° to the lengthwise and crosswise directions). Consequently, it is desirable to provide an illumination system that can provide a controllable and relatively precise or "clean" cut-off angle; the cut-off angle being that angle beyond which light output from the illumination system is essentially insignificant or visually unnoticeable.

Glare problems from ceiling luminaires are exacerbated by the continued development of brighter, more compact and more efficient light sources. Some of these newly developed light sources may cause damage to a person's eyes, if viewed directly. In addition, bright light directly entering a person's eyes will lead to fatigue and lower worker productivity. For these reasons, it is highly desirable to provide an illumination system having a controllable and clean cut-off angle.

Illumination systems provide a means for redirecting light output from a light source to a specific location. For light sources having a narrow angular output distribution, U.S. Pat. Nos. 4,984,114 to Cobb et al. (the '144 patent) and 5,190,370 to Miller et al. (the '370 patent) disclose hollow illumination systems that include a plurality of prisms within which light rays from the light source are totally internally reflected before emerging from the illumination system. The light source emits either a cone (the '144 patent) or a collimated beam of light (the '370 patent) which contacts the prisms at a small angle with respect to the plane of the output surface of the illumination system. Virtually all light rays emitted by the light source enter the prisms and emerge from the illumination system. The angular distribution of the light output is controlled by the limited angular output of the light source and the prisms merely provide the means by which the light rays emerge from the illumination system. Consequently, the illumination systems disclosed in these references are suited only for light sources that emit narrow beams or columns of light.

For light sources having a broad or disperse angular distribution of light rays, U.S. Pat. No. 5,676,453 to Parkyn, Jr. et al. (the '453 patent) discloses an illumination system including a collimating totally-internally-reflective lens that redirects light rays from a fluorescent light source to a light target zone. While the lens redirects, and in some way, orients the light rays from the light source as they emerge from the illumination system, the uniformity of the output is not controlled by the lens disclosed in this reference and consequently, light sources may appear as "hot spots". Even though this references discloses tailoring or controlling one direction of angular distribution of light output, clean cut-off angles of greater than approximately 60° are not possible.

A luminare having two generally orthogonally arranged corrugated sheets is disclosed in U.S. Pat. No. 4,452.449 (the '449 patent) to Whitehead. The corrugated sheets disclosed in this reference are characterized by a property referred to as octature—wherein surfaces on the same side of a corrugated sheet are either parallel or perpendicular to one another, and surfaces on opposite sides of the corrugated sheet are at 45° to each other. Consequently, the included angle of the prisms of the corrugated sheets is necessarily limited to 90°. This reference further discloses the desirability of concentrating the light output from the luminaire over the angular viewing range between 0° and 30° from normal.

There exists a need in the art for an illumination system that accepts light input from a variety of different light sources and that provides a light output having a predetermined angular distribution with a clean cut-off angle and good light output uniformity.

SUMMARY OF THE INVENTION

The present invention provides an illumination system having a hollow waveguide including first and second light directing arrays (LDA), each having a plurality of generally lenticular prisms defined thereon and arranged generally orthogonally with respect to each other. Light rays from a light source enter the waveguide through a light input side, exit the waveguide through a light output side and emerge from the illumination system at a predetermined flux (i.e. intensity) and angular distribution. The light output flux and angular distribution can each be independently controlled in accordance with the present invention by the LDAs to provide an illumination system that can be configured for various light output distribution and intensity requirements.

The illumination system includes a hollow waveguide having a light input side through which light rays from a light source enter the hollow waveguide and a light output side from which light rays emerge from the hollow waveguide. The illumination system further includes a first light directing array having a first light directing feature defined thereon and a second light directing array having a second light directing feature defined thereon. The first and second light directing features are arranged generally orthogonally with respect to each other, with the second light directing array comprising the light output side of the hollow waveguide. The hollow waveguide may be generally rectangular, square, circular, annular, triangular, or any other generally polygonal shape. A single, or a plurality of light sources may be optically coupled with the hollow waveguide of the present invention.

The illumination system of the present invention may comprise a generally rectangular hollow waveguide having a light input side through which light rays from a light source enter the hollow waveguide and a light output side from which light rays emerge from the hollow waveguide. A first light directing array having a first light directing feature defined thereon and a second light directing array having a second light directing feature defined thereon are included in the illumination system of the present invention. The first and second light directing features are arranged generally orthogonally with respect to each other and the second light directing array comprises the light output side of the hollow waveguide.

BRIEF DESCRIPTION OF THE DRAWINGS

The invention will be more fully understood and further advantages will become apparent when reference is made to the following detailed description of the preferred embodiments of the invention and the accompanying drawings in which like reference characters denote similar elements throughout the several views and wherein:

FIGS. 7 is a side view of a light directing array showing the included angle and angular distribution range of light output;

DESCRIPTION OF THE PREFERRED EMBODIMENTS

The present invention provides an illumination system having a hollow waveguide including first and second light directing arrays (LDA), each having a plurality of generally lenticular prisms defined thereon and arranged generally orthogonally with respect to each other. Light rays from a light source enter the waveguide through a light input side, exit the waveguide through a light output side and emerge from the illumination system at a predetermined flux (i.e. intensity) and angular distribution. The light output flux and angular distribution can each be independently controlled in accordance with the present invention by the LDAs to provide an illumination system that can be configured for various light output distribution and intensity requirements.

As used herein, the terms incident angle and exit angle refers to the angle a light ray makes with the normal to the surface that the light ray strikes.

Figure 1A:
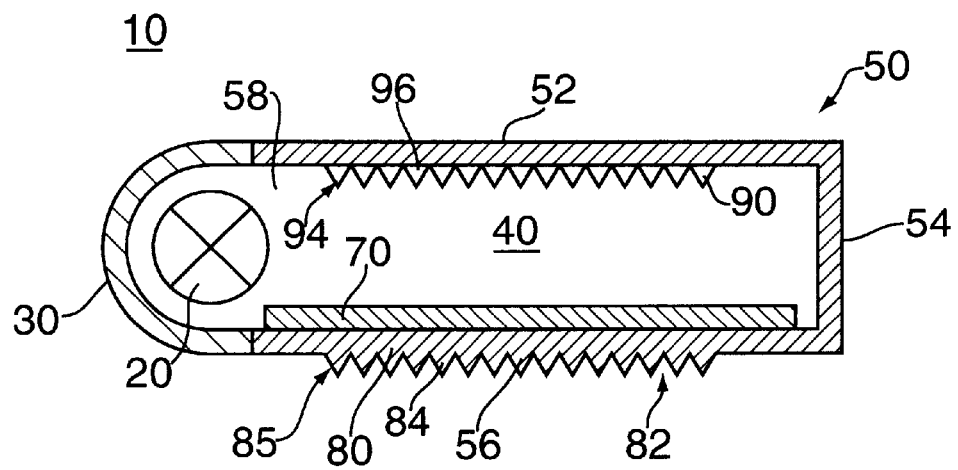
FIG. 1a is a cross-sectional view of an illumination system having a single light source, a hollow waveguide, two stackingly arranged light directing arrays each having a light directing feature defined thereon arranged generally orthogonally with respect to each other, and constructed in accordance with the present invention.
Figure 1B:
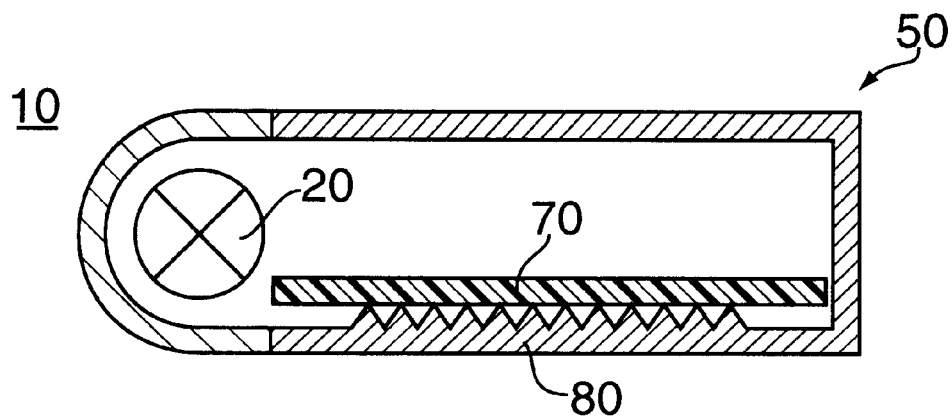
FIG. 1b is a cross-sectional view of an illumination system having a single light source, a generally polygonal hollow waveguide, two stackingly arranged light directing arrays each having a light directing feature defined thereon arranged generally orthogonally with respect to each other and disposed in generally confronting opposition to each other, and constructed in accordance with the present invention.
Figure 1C:
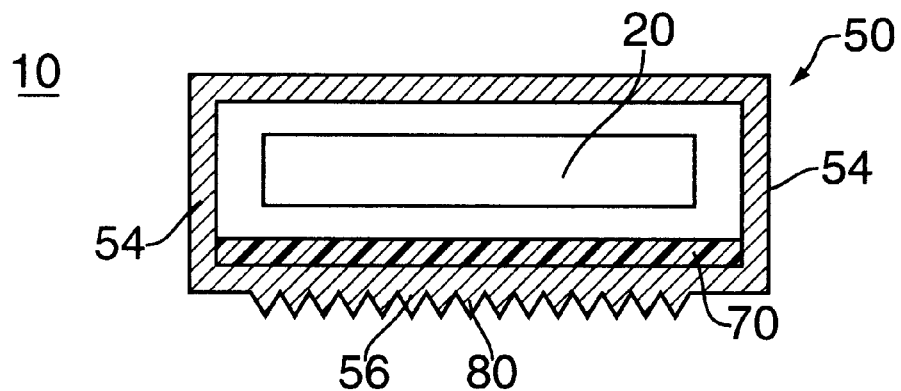
FIG. 1c is a cross-sectional view of an illumination system having a single light source located generally, behind the output surface of the illumination system, a generally polygonal hollow waveguide, two stackingly arranged light directing arrays each having a light directing feature defined thereon arranged generally orthogonally with respect to each other, and constructed in accordance with the present invention.

Referring to the drawings, in FIG. 1a there is shown an illumination system 10 in accordance with a first embodiment of the present invention. The illumination system 10 includes a generally rectangular hollow waveguide 50 having a light input side 58 through which light rays from a light source 20 enter the hollow waveguide 50, a generally reflective side 54 located opposite the light input side 58, a back 52, and a light output side 56 located opposite the back 52 and from which light rays emerge from the waveguide 50 of the illumination system 10. The back 52, light output side 56 and side 54 may be unitarily formed by extrusion, injection molding, or other similar manufacturing processes. Alternately, these components may be separately fabricated and fastened together to form the hollow waveguide 50 of the present invention. The light source 20 is preferably located so that light rays emanating therefrom enter the hollow waveguide 50 at an angle generally perpendicular to the normal (i.e. 0°) viewing angle of the illumination system 10. This configuration eliminates light "hot spots" and contributes, at least in part, to the uniform distribution of light output from the illumination system 10. Alternatively, and as shown in FIG. 1c, the light source 20 may be located inside the hollow waveguide so that it's light rays run generally parallel to the normal viewing angle. Although this configuration may provide light "hot spots", control of the angular distribution of light output from the illumination system 10 is nonetheless controlled in accordance with the present invention and as described in detail below. As used herein, the term "hot spots" refers to the appearance to a viewer that the light output from an illumination system is brighter in some spots when viewing the light output.

The back 52, side 54 and light output side 56 define a light channel 40 within which light rays from the light source 20 propagate. The back 52 may be completely reflective, such as a mirror, for, or alternatively, the back 52 may be partially reflective and partially refractive (i.e. diffusing reflective) such as a light directing array (LDA) 90. In a preferred embodiment, the back 52 comprises an LDA 90 having a plurality of generally lenticular prisms 94 defined longitudinally therealong which are oriented generally parallel to light input side 58 of the hollow waveguide 50. The prisms 94 of LDA 90 define an included angle 96 that is preferably between approximately 105° and 115°, most preferably approximately 110°, that controls the amount of light rays that emerge from the back 52 of the hollow waveguide 50. For an included angle of approximately 110°, the LDA 90 is totally internally reflective (TIR) for light rays that contact the prism 94 at certain incident angles and approximately 30% of the light rays emitted by the light source 20 emerge from the back 52 (i.e. through the LDA 90). The partially reflective and partially refractive back 52 permits a predetermined amount of light rays to emerge from the back 52 of the hollow waveguide 50, which provides a controllable amount of backside lighting for the illumination system 10, which is desirable for certain illumination system applications. By changing the included angle 96, the amount (i.e. percentage) of light rays emerging from the back 52 (and consequently, emerging from the light output side 56) may be controlled. The light output intensity of the illumination system 10 of the present invention may thus be controlled by the design of the back 52 of the hollow waveguide 50.

First and second light directing arrays (LDAs) 70, 80 control the passage of light rays out of the hollow waveguide 50. In a preferred embodiment, the second LDA 80 comprises the light output side 56 of the hollow waveguide 50. The LDAs 70, 80 are configured to control the angular distribution of the light output of the illumination system 10 by refracting light rays that would emerge from the LDAs 70, 80 within a predetermined cut-off angle and by reflecting back light rays that would emerge from the LDAs 70, 80 outside the predetermined cut-off angle. In other words, the only light rays that emerge from the hollow waveguide 50 are those within the predetermined output angular distribution, as defined by the cut-off angle. Consequently, the illumination system 10 of the present invention provides a controllable and predeterminable angular distribution of light output. Light rays that would emerge from the LDAs 70, 80 at angles outside of the desired cut-off angular range are reflected back into and within the light channel 40, with their angles more or less changed, until they either pass through the partially reflective back 52 (i.e. the LDA 90) or propagate within the light channel 40 until they contact the first LDA 70 again. This effective recycling of light rays within the hollow waveguide 50 provides an illumination system 10 having a light output that is substantially uniformly distributed over the light output side 56 of the illumination system 10.

Figure 6A:
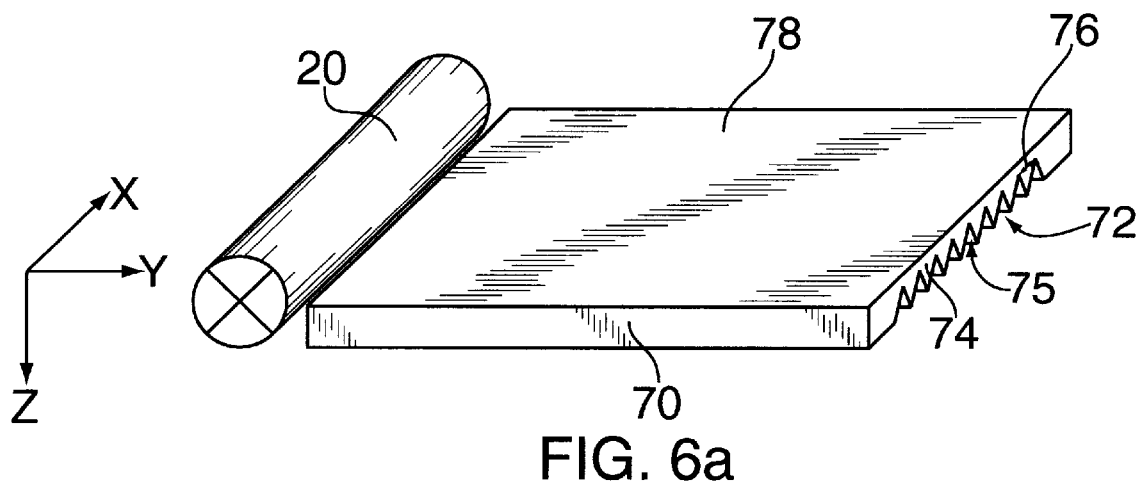
FIG. 6a is a perspective view of a first light directing array constructed in accordance with the present invention.
Figure 6B:
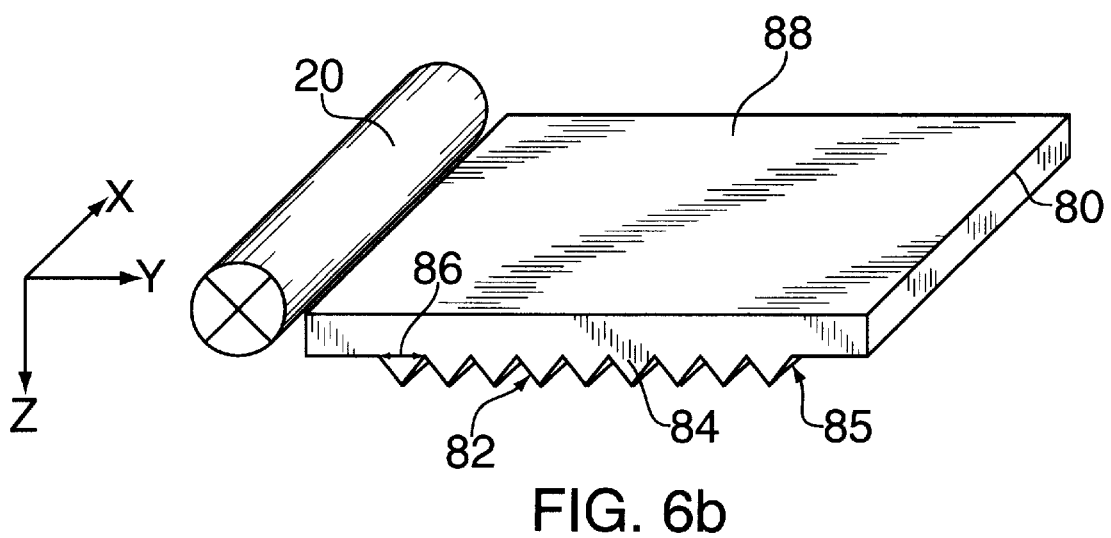
FIG. 6b is a perspective view of a second light directing array constructed in accordance with the present invention.

An example of the first LDA 70, shown also in FIG. 6a, is located within the light channel 40 of the waveguide 50 and includes a plurality of generally longitudinal lenticular prisms 74 as a first light directing feature 72 and a first light output surface 75 that faces toward the second LDA 80. In this example, the prisms 74 are oriented substantially perpendicular to the light output side 56 of the hollow waveguide 50 (indicated by the y-axis in FIG. 6a), although the prisms 74 may also be oriented substantially parallel to the light input side 58 of the waveguide 50. The orientation of the light directing feature 72 of the first LDA 70 (i.e., the prism 74) is not independently critical, so long as the light directing feature 72 is oriented generally orthogonally with respect to the light directing feature 82 of the second LDA 80. Light rays enter the first LDA 70 through a light input surface 78 that is defined on a surface of the first LDA 70 facing inwardly toward the light channel 40. The light input surface 78 comprises substantially the entire inwardly facing surface of the first LDA 70 and consequently, the aperture through which light rays may enter the first LDA 70 is approximately equivalent to the size of the first LDA 70. While virtually all light rays traveling within the light channel 40 initially enter the first LDA 70 via the light input surface 78, only certain light rays emerge from the first LDA 70 and pass into the second LDA 80. More specifically, the light directing feature 72 of the first LDA 70 controls the emergence of light rays from the first LDA 70 so that only light rays having a predetermined angular distribution pass from the first LDA 70 to the second LDA 80. Thus, the first LDA 70 is configured to pass only certain light rays through to the second LDA 80, and to reflect back into the light channel 40 certain other light rays. If the hollow waveguide 50 includes a reflective back 52, the light rays reflected by the first LDA 70 will propagate within the light channel 40 with their vector angle more or less changed until they pass through the light input surface 78 and contact the light directing feature 72 again, or until they reach the far end of the light channel 40. On the other hand, if the hollow waveguide 50 includes a partially reflective/partially refractive back, i.e. a LDA 90, part of the light rays reflected by the first LDA 70 will pass through the LDA 90 and exit through the back 52 of the hollow waveguide 50.

Control of the light rays passing through and reflected by the first LDA 70 is effected in part by the material from which the LDA is constructed and in part by the geometry of the lenticular prism 74, i.e. by the included angle 76 (discussed in more detail below). While the preferred material is acrylic, other clear plastic materials are contemplated by the present invention, including, but not limited to clear polycarbonate, polystyrene, silicone, polyester, and nylon. Each lenticular prism 74 of the first LDA 70 defines an included angle 76 that controls the emergence of light rays from the first LDA 70 so that only light rays having an exit angle that is less than or equal to the desired cut-off angle emerge from the first LDA 70. In the preferred embodiment, the desired cut-off angle is approximately ±60°. The included angle 76 of the prisms 74 of the first LDA 70 controls the angular distribution of light output from the illumination device 10 by controlling the angular distribution of light emerging from the first LDA 70 in a first direction, i.e. in the x-direction indicated in FIGS. 2b and 6a. The included angle 76 is determined by the refractive index of the LDA (which is determined by the material from which the LDA is fabricated), the angular distribution of the light input to the LDA, and the desired angular distribution of light output from the illumination system 10. For acrylic LDAs, where the refractive index is approximately equal to 1.49, and for a light input angular distribution of full hemisphere and a desired output angular distribution of between approximately ±60°, the included angle 76 ranges from between about 115° and 121°. It will be obvious to persons skilled in the art that other included angles will permit light rays having greater or lesser exit angles to pass through the first LDA 70. Consequently, the present invention is not limited to the disclosed desired cut-off angular range of ±55°, but rather, includes virtually all cut-off angular ranges—whether they be symmetrical (e.g. ±55°), asymmetrical (e.g. +30°, −75°), or otherwise. For asymmetrical output distributions, the lenticular prism of the LDA will also be asymmetrical. A detailed description of the calculation of the included angle is provided below.

The first LDA 70 may rest freely within the light channel 40 or it may be secured to the hollow waveguide 50 such as by in a channel or groove 62 (see FIG. 2a) or by other known fastening or affixation means.

The second LDA 80 is located on an outer surface of the hollow waveguide 50 and is preferably unitarily formed therewith. Alternatively, the second LDA 80 may be formed on an inner surface of the hollow waveguide 50, as shown in FIG. 1b, in which case the prisms 74 of the first LDA 70 and the prisms 84 of the second LDA 80 would lie in close confronting opposition to each other. Although no direct coupling or contact is required between the first and second LDAs 70, 80, such contact would not effect the performance and operation of the present invention. The second LDA 80 includes a plurality of generally longitudinal lenticular prisms 84 as a second light directing feature 82 and a second light output surface 85 from which light rays emerge. The second light directing feature 82 is oriented generally orthogonally with respect to the first light directing feature 72 to achieve control of light rays emerging from the hollow waveguide 50 in two directions.

Control of the light rays passing through and reflected by the second LDA 80 is effected in the same manner as described above for the first LDA 70.

The light source 20 is preferably a generally tubular device such as a fluorescent tube, but may also comprise, by way of non-limiting example, an array of incandescent lights, light-emitting diodes, lasers, and halogen light sources arranged in any configuration. A reflector 30 surrounds the light source 20 and directs light rays from the light source 20 into the light channel 40 of the hollow waveguide 50.

Figure 11:
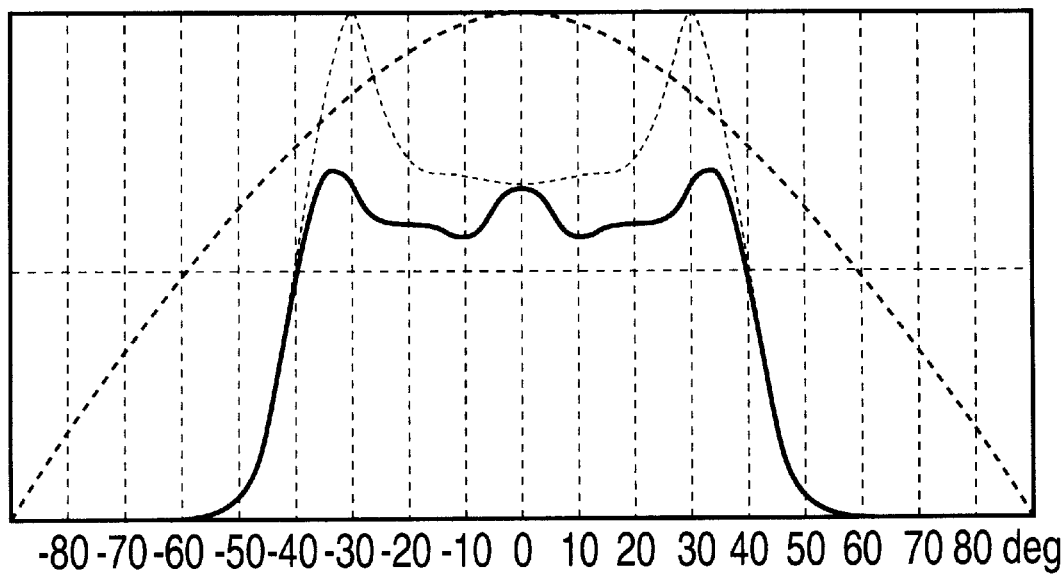
FIG. 11 is a graphical representation of the light output of an illumination having a mirrored back and constructed in accordance with the present invention.
Figure 12:
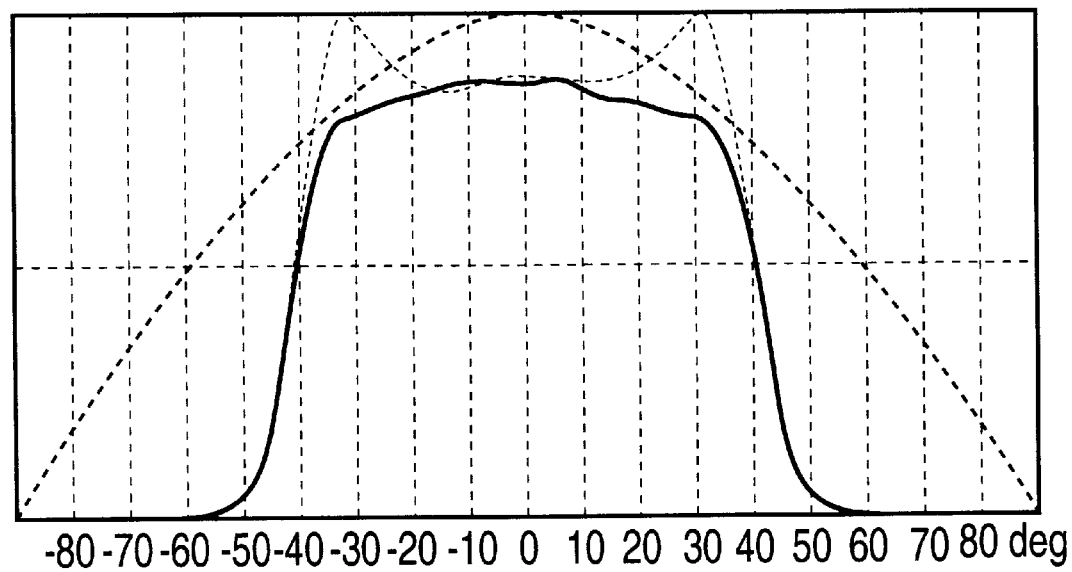
FIG. 12 is a graphical representation of the light output of an illumination having a diffusing reflecting back and constructed in accordance with the present invention.

For certain lighting applications, it is desirable to provide maximum light output when viewing the illumination system 10 at a viewing angle of approximately 0°, i.e. when viewing the illumination system 10 head-on or in a direction perpendicular to the light output surface 85 (described in more detail below). This viewing angle will be referred to herein is the normal viewing angle. The intensity of the light output for a viewing angle of 0° can be controlled by choosing the back 52. For example, a mirrored back 52 will result in a lower intensity light output when viewing the illumination system 10 from the normal viewing angle without effecting the cut-off angle, as shown in FIG. 11. A diffusing reflective back 52, on the other hand, will result in a higher intensity light output from the normal viewing angle, as shown in FIG. 12. It is also be desirable to control the angular distribution of the light output to achieve a relatively uniform distribution of light over a desired angular viewing range, i.e. to eliminate hot spots. Preferably, the light output from the hollow waveguide (i.e. from the illumination system 10) will be fairly uniform over the desired angular viewing range, and will be virtually non-existent when the system 10 is being viewed at angles outside of the desired angular viewing range. The angular distribution of light output from the hollow waveguide 50 thus defines angular viewing limitations beyond which virtually no light is visually detectable as emerging from the illumination system 10. The viewing angle beyond which no light is visually detectable is referred to herein as the cut-off angle. By way of non-limiting example, the following detailed description will be directed to an illumination system 10 that has a cut-off angle of approximately ±60°. It will be obvious to persons skilled in the art that this cut-off angular range is an illustrative and non-limiting example of the present invention and that greater or lesser angular viewing ranges are contemplated by the present invention.

The present invention controls the emergence of light rays from the hollow waveguide 50 in two directions. More specifically, and with reference to FIG. 2b, which shows the view of the illumination system 10 in the normal viewing angle, the first LDA 70 controls the angular distribution of light output in the x-direction and the second LDA 80 controls the angular distribution of light output in the y-direction. Consequently, the light output from the illumination system 10 of the present invention is substantially uniform when viewed within the desired angular viewing range and light hot spots are effectively eliminated. The angular range of light output from the illumination system 10 can be controlled by changing the included angle of either or both the first and second LDAs 70, 80.

Figure 8:
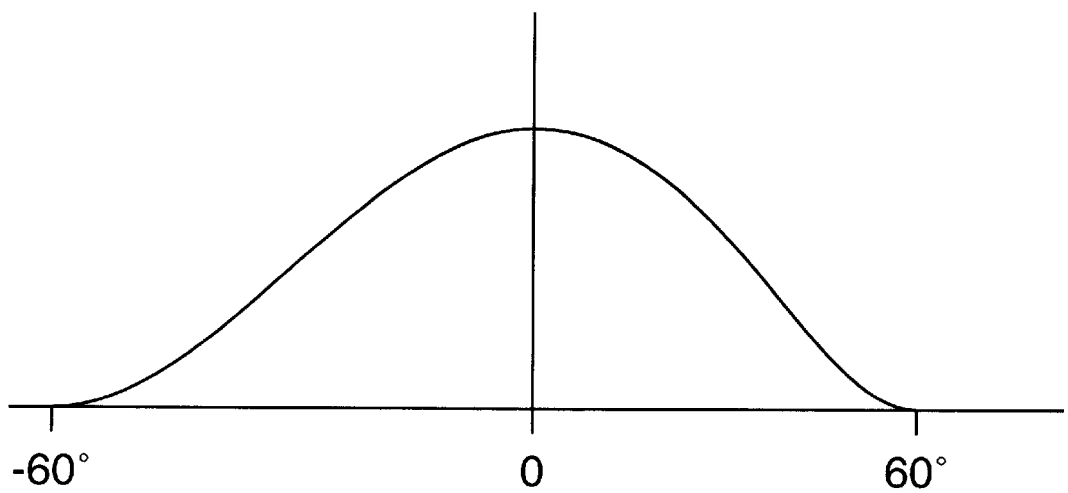
FIG. 8 is a graphical representation of the theoretical light output distribution and intensity of an illumination system constructed in accordance with a preferred embodiment of the present invention.

In a preferred embodiment, the light output distribution is uniform within the defined output angular range. As the viewing angle moves away from 0° in either direction (i.e. positive or negative), the intensity of the light output from the illumination system 10 decreases, reaching a cut-off angle at which no significant amount of light appears to the viewer to be emerging from the illumination system 10. This is illustrated graphically in FIG. 8, where the cut-off angle equals approximately ±60°. By changing the included angle of either or both of the LDAs 70, 80, the cut-off angle may be changed.

Figure 1D:
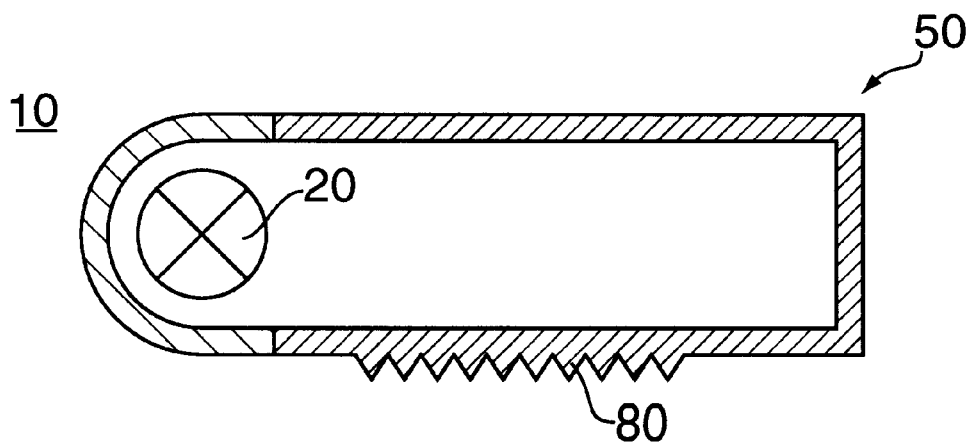
FIG. 1d is a cross-sectional view of an illumination system having a single light source, a generally polygonal hollow waveguide, a light directing array having a light directing feature defined thereon, and constructed in accordance with the present invention.

In an alternative embodiment, the illumination system 10 of the present invention may contain a single LDA 80, as shown in FIG. 1d. The angular distribution of light output from this illumination system 10 is still controllable in accordance with the present invention and as described above for the embodiment of FIG. 1a, with the single exception that the angular distribution is controllable in a single direction. In all other respects, the operation of the illumination system 10 shown in FIG. 1d is substantially equivalent to that for the system 10 shown in FIG. 1a and disclosed in detail above.

Figure 2A:
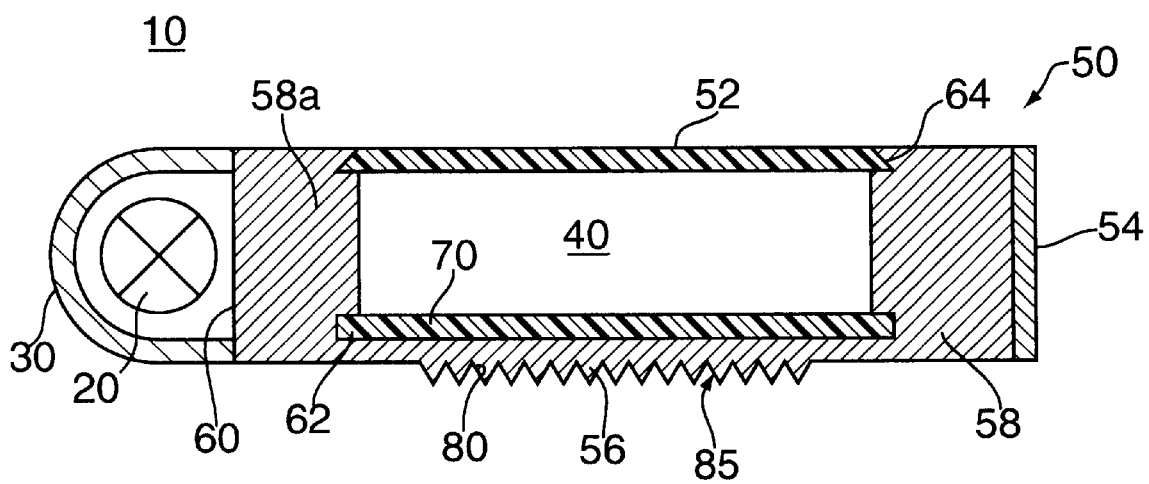
FIG. 2a is a cross-sectional view of an illumination system having a single light source, a generally rectangular hollow waveguide, two stackingly arranged light directing arrays each having a light directing feature defined thereon arranged generally orthogonally with respect to each other, and constructed in accordance with the present invention.

Referring to FIG. 2a, there is shown a second embodiment of the illumination system 10 of the present invention. A generally rectangular or square hollow waveguide 50 includes a solid light input side 58a which defines a light accepting surface 60 that is located proximate a light source 20. As used herein, the term proximate includes contacting as well as nearly contacting, i.e. preferably less than or equal to one-inch. The solid light input side 58a physically separates and optically connects the light source 20 and the light channel 40. A reflector 30 surrounds the light source 20 and redirects light rays toward the solid light input side 58a of the waveguide 50. The hollow waveguide 50 includes a light output side 56 that may be comprised of a first LDA 70 and a second LDA 80, each having generally lenticular prisms 74, 84 defined thereon which define respective light directing features 72, 82 which are arranged generally orthogonally with respect to each other. The first LDA 70 may rest freely within the light channel 40 of the hollow waveguide 50 or it may be secured therein by means of a groove or channel 62. The second LDA 80 is preferably unitarily formed with the hollow waveguide 50, which may be fabricated by extrusion, injection molding, or other similar forming and shaping processes. The hollow waveguide 50 includes a back 52 that may be reflective or alternatively, it may be partially reflective and partially refractive (i.e. diffusing), in which case the back 52 comprises an LDA 90. In either case, the back 52 rests in a groove or channel 64 defined in the solid light input side 58a.

In operation, light rays from the light source 20 contact the light accepting surface 60 and travel through the solid light input side 58a into the light channel 40. Some of the light rays travel across the light channel 40, contact the side 54 located opposite of the solid light input side 58a, and are reflected back into the light channel 40. Some of the light rays may contact the rear 52 and will also be reflected back into the light channel 40, while other light rays will contact the light input surface 78 of and pass into the first LDA 70. These light rays will either be reflected back into the channel 40 or will emerge from the first LDA 70, depending upon the angular distribution of these light rays. The light rays that emerge from the first LDA 70 will contact the light input surface 88 of and pass into the second LDA 80. Only those light rays having an angular distribution of ±60° will emerge from the second LDA 80 through the light output surface 85.

Figure 2B:
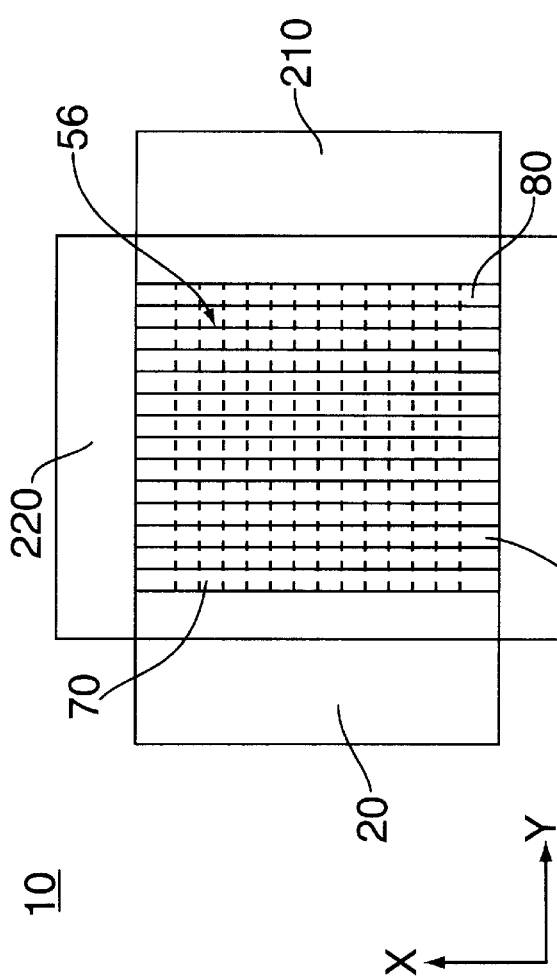
FIG. 2b is a front view or normal angular view of the illumination system of FIG. 2a having multiple peripherally disposed light sources, and constructed in accordance with the present invention.

The embodiment of FIG. 2a may also include up to three additional light sources 200, 210, 220, as depicted in FIG. 2b. The illumination system 10 of this embodiment is substantially functionally equivalent to that depicted in FIG. 2a and described in detail above. Of course, the additional light sources 200 provide additional light rays and the light output intensity of this embodiment may be greater than the embodiment of FIG. 2a. As for the reflection and refraction of light rays within the hollow waveguide 50 and through the LDAs 70, 80 and 90 (if provided), the description provided above for the embodiment of FIG. 2a applies equally to the embodiment of FIG. 2b.

Figure 3:
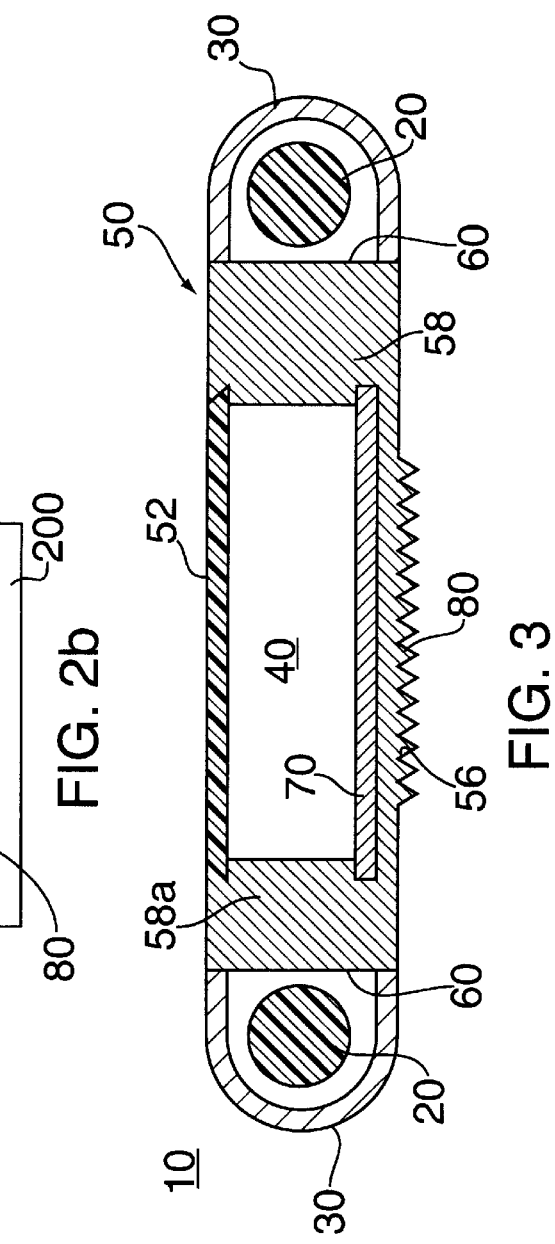
FIG. 3 is a cross-sectional view of an illumination system having a single annular light source, a generally circular hollow waveguide, two stackingly arranged light directing arrays each having a light directing feature defined thereon arranged generally orthogonally with respect to each other, and constructed in accordance with the present invention.

Still another embodiment of the present invention is depicted in FIG. 3, wherein the light illumination system 10 includes a hollow circular waveguide 50 surrounded by a generally annular light source 20. The illumination system 10 of this embodiment is substantially functionally equivalent to the embodiments described above.

Figure 4A:
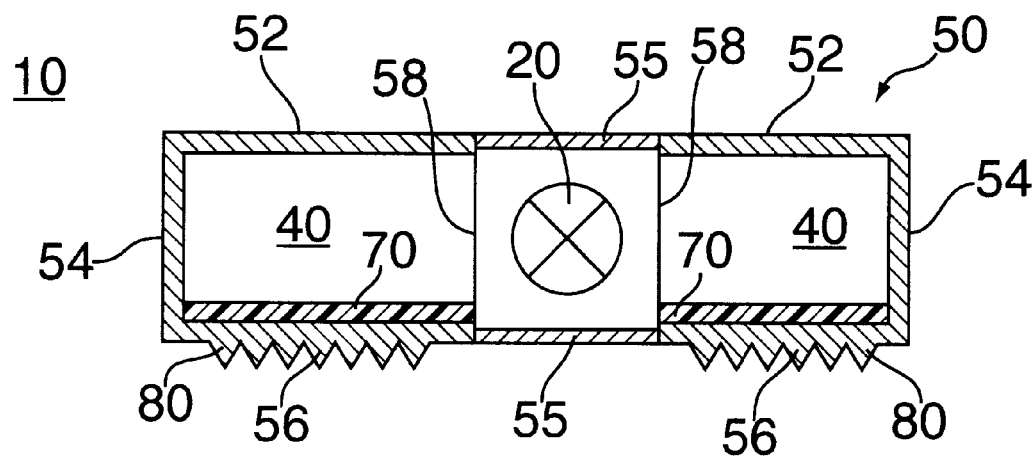
FIG. 4a is a cross-sectional view of an illumination system having a single point-like light source, a generally annular hollow waveguide, two stackingly arranged light directing arrays each having a light directing feature defined thereon arranged generally orthogonally with respect to each other, and constructed in accordance with the present invention.

Yet another embodiment of the present invention is depicted in FIG. 4a, wherein a generally annular hollow waveguide 50 surrounds a generally point-like light source 20. The light source 20 of this embodiment may comprise a single light or an array of lights. The illumination system 10 of this embodiment is otherwise substantially functionally equivalent to the embodiments described above.

Figure 4B:
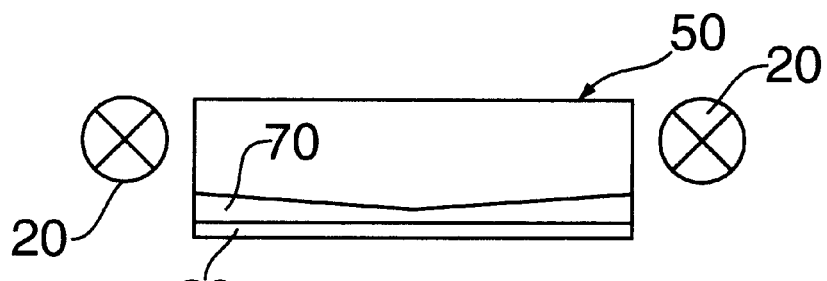
FIG. 4b is a cross-sectional view of an illumination system having a generally round hollow waveguide, a first radial prism light directing array and a second annular light directing array, each having a light directing feature defined thereon arranged generally orthogonally with respect to each other, and constructed in accordance with the present invention.
Figure 4C:
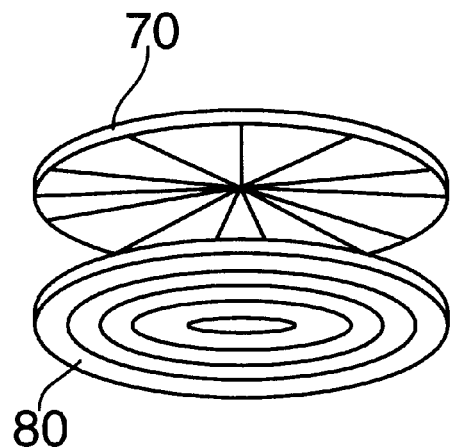
FIG. 4c is an isometric view of the illumination system of FIG. 4b showing a radial prism light directing array stackingly arranged with an annular prism light directing array.

The generally orthogonal relationship between the first and second LDAs 70, 80 required by the present invention is clearly depicted in FIG. 4b and FIG. 4c, wherein the illumination system 10 includes a circular waveguide 50 having a first LDA 70 having radially oriented prisms 74 stackingly arranged with a second LDA 80 having concentrically arranged annular prisms 84. As long as the generally orthogonal relationship between the light directing features 72, 82 (i.e., between the prisms 74, 84) of the stacked LDAs 70, 80 is maintained at every position about the circular waveguide 50, the specific light directing features 72, 82 features or construction of each LDA may be varied. For example, the specific light directing features 72, 82 in the LDAs may be constructed as clockwise and counterclockwise generally spiral prism arrays.

Figure 5A:
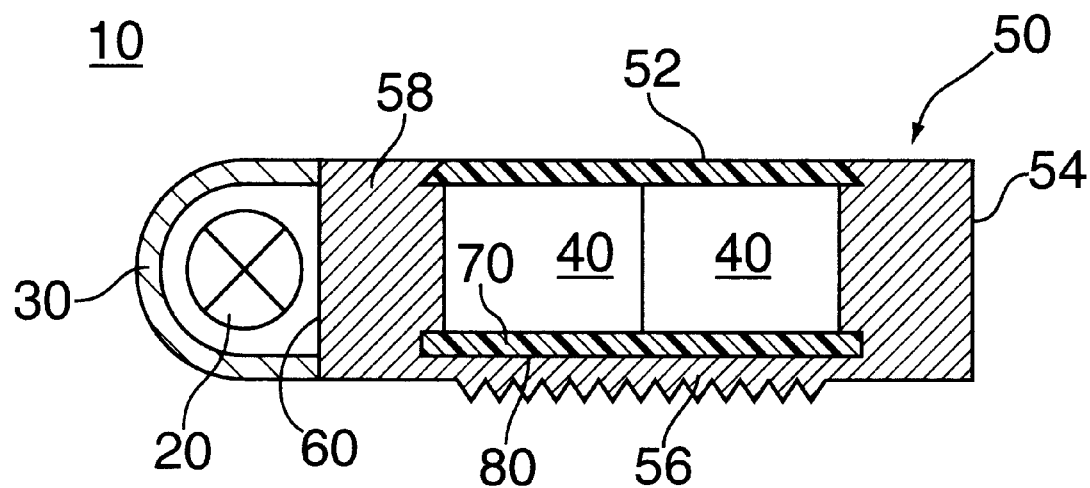
FIG. 5a is a cross-sectional view of an illumination system having a single light source, a generally triangular hollow waveguide, two stackingly arranged light directing arrays each having a light directing feature defined thereon arranged generally orthogonally with respect to each other, and constructed in accordance with the present invention.
Figure 5B:
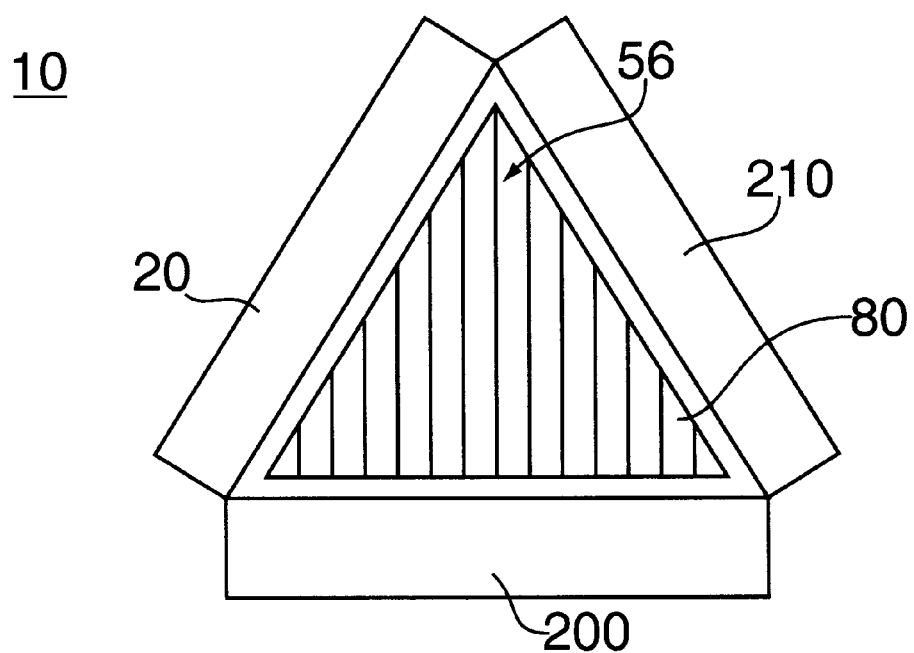
FIG. 5b is a front view of the illumination system of FIG. 5a having multiple peripherally disposed light sources.

Referring next to FIG. 5a, the illumination system 10 of the present invention includes a triangular hollow waveguide 50 having a light source 20. Second and third light sources 200, 210 may also be provided as depicted in FIG. 5b. The illumination system 10 of this embodiment is substantially functionally equivalent to the embodiments described above.

In each of the above-described embodiments, the second LDA 80 may be unitarily formed with the hollow waveguide 50, or alternatively, it may be separately formed and fastened to the hollow waveguide 50 by any known fastening and affixation techniques. For each of the above-described embodiments, the lenticular prisms 84 and second light directing feature 82 may be located either within the light channel 40, as shown in FIG. 1b, or outside of the waveguide 50 (see, e.g. FIG. 1a), as long as the relationship between the first and second light directing features 72, 82 is generally orthogonal. When the second light directing feature 82 is located within the light channel 40, the lenticular prisms 84 are totally internally reflective, and all light rays that pass through the surface 85 and into the second LDA 80 emerge from the hollow waveguide 50.

As used herein, the term generally orthogonal is intended to refer to a relationship between the first and second light directing features 72, 82 that is defined by an angular relation of between 80° and 100°; more preferably between 85° and 95°; and most preferably, 90°.

Figure 9A:
FIGS. 9a–9d are detailed views of various lenticular prism configurations in accordance with the present invention.
Figure 9B:
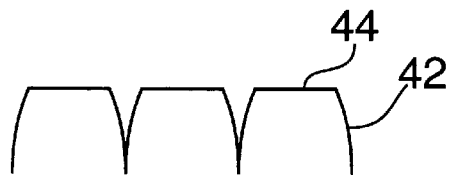
Figure 9C:
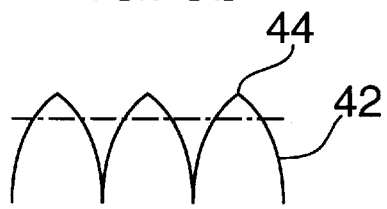
Figure 9D:
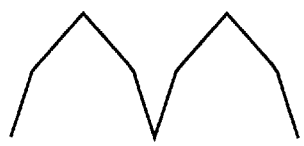

While the LDAs 70, 80, 90 have been disclosed herein as comprising a plurality of generally lenticular prisms, various geometries and configurations for the prisms are contemplated by the present invention. More specifically, and as depicted in FIG. 9a, the prisms preferably include substantially straight side-walls 42 and a well-defined peak 44. Alternatively, the prisms may include curved side-walls 42 and a substantially flat or planar peak (see FIG. 9b). The prisms may also alternatively comprise curved side-walls 42 and a well-defined peak 42, as depicted in FIG. 9c. In still another alternative, the prisms may be multi-faceted, as shown in FIG., 9d. It will be obvious to persons skilled in the art that still other geometries and configurations for the prisms are contemplated by the present invention.

Light directing arrays 70, 80, 90 can be constructed from any transparent material. Preferred materials have an index of refraction greater than or equal to about 1.30 and include glass, polymethylmethacrylate, polycarbonate, polyester, polystyrene and other polymers formed by photopolymerization of acrylate monomers. The index of refraction of the preferred materials ranges from between about 1.40 and 1.70. It will be obvious to persons skilled in the art that materials having greater or lesser refractive indices are also contemplated by the present invention.

Calculation of the included angle for prisms having substantially straight sides (see, e.g. FIG. 9*a*) and for a generally symmetrical cut-off angle will now be discussed in detail. The included angle is dependent upon the refractive index of the material from which the LDA is fabricated, the desired angular light output distribution, and the input light angular distribution. The variables and constants for the calculations are defined as follows:

w=included angle of the prism;
C=desired cut-off angle; and
n=refractive index of prism material.

Referring to FIG. 7, the following equations define the conditions necessary to calculate the included angle for any angular distribution of light output from the hollow waveguide 50 having a cut-off angle C of ±90°.

$$w/2 \leq C \quad (1)$$

$$w \leq 2(2*a\sin(1/n)+90)/3 \quad (2)$$

$$\tan(w/2) \leq (n*\sin(a\sin(1/n)-3w/2)+\cos(w/2))/(n*\cos(a\sin(1/n)-3w/2)-\sin(w/2)) \quad (3)$$

Figure 10:
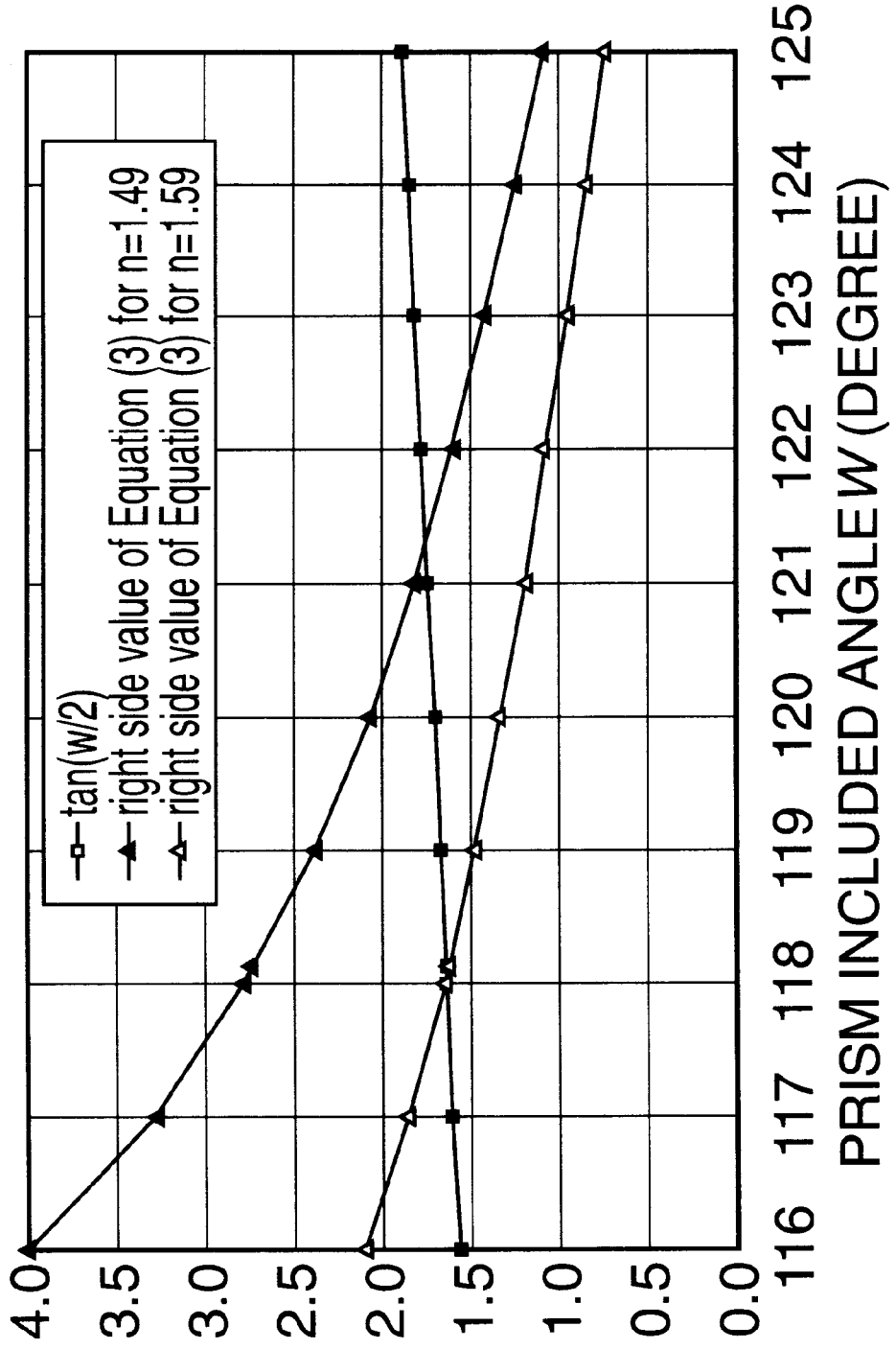
FIG. 10 is a graphical representation of the included angle limitations for acrylic and polycarbonate light directing arrays calculated in accordance with the present invention.

The graphical solution of equation 3 is shown in FIG. 10.

As an example, for an angular output distribution of approximately ±60° and a refractive index n=1.49 (an acrylic LDA), equation 1 requires that w≦120°. Next evaluating equation 2, w≦116°. Finally, the upper limit of w, as depicted graphically in FIG. 10-by the solid triangle graph, is approximately 121.5°. Therefore, the included angle is in the range of between approximately 116° and 120°.

For a polycarbonate LDA having a refractive index n=1.59, and the same angular output distribution, equation 2 requires that w≦112°. Referring again to the graph of FIG. 10, the upper limit of w (depicted by the clear triangle graph) is approximately 118.1°. The included angle is therefore in the range of between approximately 112° and 118.1°.

For prisms having curved or otherwise constructed sidewalls, both minimum and maximum included angles should meet the conditions defined by equations (1), (2), and (3).

Having thus described the invention in detail, it will be recognized that such detail need not be strictly adhered to but that various changes and modifications may suggest themselves to one skilled in the art, all falling within the scope and spirit of the present invention, as defined by the subjoined claims.

What is claimed is:

1. An illumination system for distributing light rays from a light source, said illumination system comprising:
   a hollow waveguide having a light input side through which light rays from the light source enter said hollow waveguide and a light output side from which light rays emerge from said hollow waveguide;
   a first light directing array having a first light directing feature defined thereon; and
   a second light directing array having a second light directing feature defined thereon, said first and said second light directing features being arranged generally orthogonally with respect to each other, said second light directing array comprising said light output side from which light rays emerge from said hollow waveguide;
   said first and said second light directing features controlling the angular distribution of light output of said illumination system by defining a cut-off angle for light output from said illumination system.

2. An illumination system as recited by claim 1, wherein said first light directing feature comprises a plurality of lenticular prisms defined on said first light directing array, and wherein said second light directing feature comprises a plurality of lenticular prisms defined on said second light directing array, each of said prisms of said first and said second light directing features having an included angle defined therein that limits said cut-off angle to 89° or less for the distribution of light output of said illumination system.

3. An illumination system as recited by claim 2, wherein each of said lenticular prisms of said first and said second light directing features includes substantially straight sidewalls when view in cross-section.

4. An illumination system as recited by claim 2, wherein each of said lenticular prisms of said first and said second light directing features includes substantially curved sidewalls when view in cross-section.

5. An illumination system as recited by claim 2, wherein each of said lenticular prisms of said first and said second light directing features includes multi-faceted sidewalls when view in cross-section.

6. An illumination system as recited by claim 2, wherein each of said lenticular prisms of said first and said second light directing features are substantially symmetrical when viewed in cross-section and define an included angle calculated by the equations:

$$w/2 \leq C$$

$$w \leq 2(2*a\sin(1/n)+90)/3$$

$$\tan(w/2) \leq (n*\sin(a\sin(1/n)-3w/2)+\cos(w/2))/(n*\cos(a\sin(1/n)-3w/2)-\sin(w/2))$$

wherein w is the included angle of each of said lenticular prism, C is the desired cut-off angle for light output from said illumination system, and n is the refractive index of the prism material.

7. An illumination system as recited by claim 2, wherein said lenticular prisms defined on one of said first and said second light directing arrays are radially oriented with respect to each other and wherein said lenticular prisms defined on said other one of said first and said second light directing arrays are concentrically arranged with respect to each other.

8. An illumination system as recited by claim 1, wherein said first and said second light directing arrays are fabricated from acrylic, and wherein said first light directing feature comprises a plurality of longitudinal lenticular prisms defined on said first light directing array and said second light directing feature comprises a plurality of longitudinal lenticular prisms defined on said second light directing array, each of said prisms of said first and said second light directing features having, an included angle of between approximately 115° and 121°.

9. An illumination system as recited by claim 8, wherein said angle is approximately 116°.

10. An illumination system as recited by claim 9, wherein said diffusing reflective back further comprises a third light directing array having a light directing feature defined thereon.

11. An illumination system as recited by claim 10, wherein said light directing feature comprises a plurality of longitudinal lenticular prisms defined on said third light directing array, each said prism having an included angle of between approximately 90° and 120°.

12. An illumination system as recited by claim 1, wherein the light source defines a longitudinal axis that is substantially parallel with said light input side of said hollow waveguide and wherein said light directing feature of said second light directing array is substantially perpendicular to the light source longitudinal axis.

13. An illumination system as recited by claim 1, wherein the light source defines at longitudinal axis that is substantially parallel with said light input side of said hollow waveguide and wherein said light directing feature of said second light directing array is substantially parallel to the light source longitudinal axis.

14. An illumination system as recited by claim 1, wherein light rays emerge from said hollow waveguide through said light output side at an angle that is generally perpendicular to the angle at which light rays enter said hollow waveguide through said light input side.

15. An illumination system as recited by claim 14, wherein said light input side further comprises a solid section made of transparent material.

16. An illumination system recited by claim 1, wherein light rays emerge from said hollow waveguide through said light output side at an angle that is generally parallel to the angle at which light rays enter said hollow waveguide through said light input side.

17. An illumination system as recited by claim 1, wherein said hollow waveguide further comprises a reflective back through which light rays from within said hollow waveguide do not pass.

18. An illumination system as recited by claim 1, wherein said hollow waveguide further comprises a diffusing reflective back through which a predetermined amount of light rays from within said hollow waveguide pass.

19. An illumination system as recited by claim 1, wherein said first and said second light directing arrays are fabricated from polycarbonate or polystyrene, and wherein said first light directing feature comprises a plurality of longitudinal lenticular prisms defined on said first light directing array and said second light directing feature comprises a plurality of longitudinal lenticular prisms defined on said second light directing array, each of said prisms of said first and said second light directing features having an included angle of between approximately 111° and 119°.

20. An illumination system as recited by claim 19, wherein said included angle is approximately 113°.

21. An illumination system as recited by claim 1, wherein said light directing feature of said second light directing array is disposed within said hollow waveguide.

22. An illumination system as recited by claim 1, wherein said light directing feature of said second light directing array is disposed without of said hollow waveguide.

23. An illumination system as recited by claim 1, wherein said hollow waveguide is generally rectangular.

24. An illumination system as recited by claim 1, wherein said hollow waveguide is generally circular.

25. An illumination system as recited by claim 1, wherein said cut-off angle ranges from between approximately +60° and −60°.

26. An illumination system as recited by claim 1, wherein said hollow waveguide is generally triangular.

27. An illumination system as recited by claim 1, wherein said cut-off angle ranges from between approximately +60° and −60°.

28. An illumination system for distributing light from a light source having a longitudinal axis, said system comprising:
   a generally rectangular hollow waveguide having a light input side through which light rays from the light source enter said hollow waveguide and a light output side from which light rays emerge from said hollow waveguide;
   a first light directing array having a first light directing feature defined thereon; and
   a second light directing array having a second light directing feature defined thereon, said first and said second light directing features being arranged generally orthogonally with respect to each other, said second light directing array comprising said light output side from which light rays emerge from said hollow waveguide;
   said first and said second light directing features controlling the angular distribution of light output of said illumination system by defining a cut-off angle for light output from said illumination system.

29. An illumination system as recited by claim 28, wherein said first light directing feature comprises a plurality of longitudinal lenticular prisms defined on said first light directing array, and wherein said second light directing feature comprises a plurality of longitudinal lenticular prisms defined on said second light directing array, each of said prisms of said first and said second light directing features having an included angle defined therein that limits said cut-off angle to 89° or less for the distribution of light output of said illumination system.

30. An illumination system as recited by claim 29, wherein each of said lenticular prisms of said first and said second light directing features includes substantially curved sidewalls when view in cross-section.

31. An illumination system as recited by claim 29, wherein each of said lenticular prisms of said first and said second light directing features includes multi-faceted sidewalls when view in cross-section.

32. An illumination system as recited by claim 29, wherein each of said lenticular prisms of said first and said second light directing features are substantially symmetrical when viewed in cross-section and define an included angle calculated by the equations:

$$w/2 \leq C$$

$$w \leq 2(2*a\sin(1/n)+90)/3$$

$$\tan(w/2) \leq (n*\sin(a\sin(1/n)-3w/2)+\cos(w/2))/(n*\cos(a\sin(1/n)-3w/2)-\sin(w/2))$$

wherein w is the included angle of each of said lenticular prism, C is the desired cut-off angle for light output from said illumination system, and n is the refractive index of the prism material.

33. An illumination system as recited by claim 29, wherein each of said lenticular prisms of said first and said second light directing features includes substantially straight sidewalls when view in cross-section.

34. An illumination system as recited by claim 28, wherein said first and said second light directing arrays are fabricated from acrylic, and wherein said first light directing feature comprises a plurality of longitudinal lenticular prisms defined on said first light directing array and said second light directing feature comprises a plurality of longitudinal lenticular prisms defined on said second light directing array, each of said prisms of said first and said second light directing features having an included angle of between approximately 115° and 121°.

35. An illumination system as recited by claim 34, wherein said included angle is approximately 116°.

36. An illumination system as recited by claim 28, wherein the light source defines a longitudinal axis that is substantially parallel with said light input side of said hollow waveguide and wherein said light directing feature of said second light directing array is substantially perpendicular to the light source longitudinal axis.

37. An illumination system as recited by claim 28, wherein the light source defines a longitudinal axis that is substantially parallel with said light input side of said hollow waveguide and wherein said light directing feature of said second light directing array is substantially parallel to the light source longitudinal axis.

38. An illumination system as recited by claim 28, wherein light rays emerge from said hollow waveguide through said light output side at an angle that is generally perpendicular to the angle at which light rays enter said hollow waveguide through said light input side.

39. An illumination system as recited by claim 38, wherein said light input side further comprises a solid section made of transparent material.

40. An illumination system as recited by claim 28, wherein said hollow waveguide further comprises a reflective back through which light rays from within said hollow waveguide do not pass.

41. An illumination system as recited by claim 28, wherein said hollow waveguide further comprises a diffusing reflective back through which a predetermined amount of light rays from within said hollow waveguide pass.

42. An illumination system as recited by claim 41, wherein said diffusing reflective back further comprises a third light directing array having a light directing feature defined thereon.

43. An illumination system as recited by claim 42, wherein said light directing feature comprises a plurality of longitudinal lenticular prisms defined on said third light directing array each said prism having an included angle of between approximately 90° and 120°.

44. An illumination system as recited by claim 28, wherein said light directing feature of said second light directing array is disposed within said hollow waveguide.

45. An illumination system as recited by claim 28, wherein said light directing feature of said second light directing array is disposed without of said hollow waveguide.

46. An illumination system as recited by claim 28, wherein said first and said second light directing arrays are fabricated from polycarbonate or polystyrene, and wherein said first light directing feature comprises a plurality of longitudinal lenticular prisms defined on said first light directing array and said second light directing feature comprises a plurality of longitudinal lenticular prisms defined on said second light directing array, each of said prisms of said first and said second light directing features having an included angle of between approximately 111° and 119°.

47. An illumination system as recited by claim 46, wherein said included angle is approximately 113°.

48. An illumination system for distributing light rays from a light source, said illumination system comprising:
   a hollow waveguide having a light input side through which light rays from the light source enter said waveguide and a light output side from which light rays emerge from said hollow waveguide; and
   a light directing array having a plurality of angled ridges that project outwardly from the hollow waveguide for controlling the angular distribution of light output of said illumination system in a single direction by defining a cut-off angle for light output from said illumination system.

49. An illumination system as recited by claim 48, wherein said light directing feature comprises a plurality of longitudinal lenticular prisms defined on said light directing array, each of said prisms of said light directing feature having an included angle defined therein that limits said cut-off angle to 89° or less for the distribution of light output of said illumination system.

50. An illumination system as recited by claim 48, wherein said included angles ranges from between approximately 110° and 121°.

51. An illumination system as recited by claim 48, wherein said cut-off angle that ranges from between approximately −60° and +60°.

* * * * *